_United States Patent Office_ 3,342,507
Patented Sept. 19, 1967

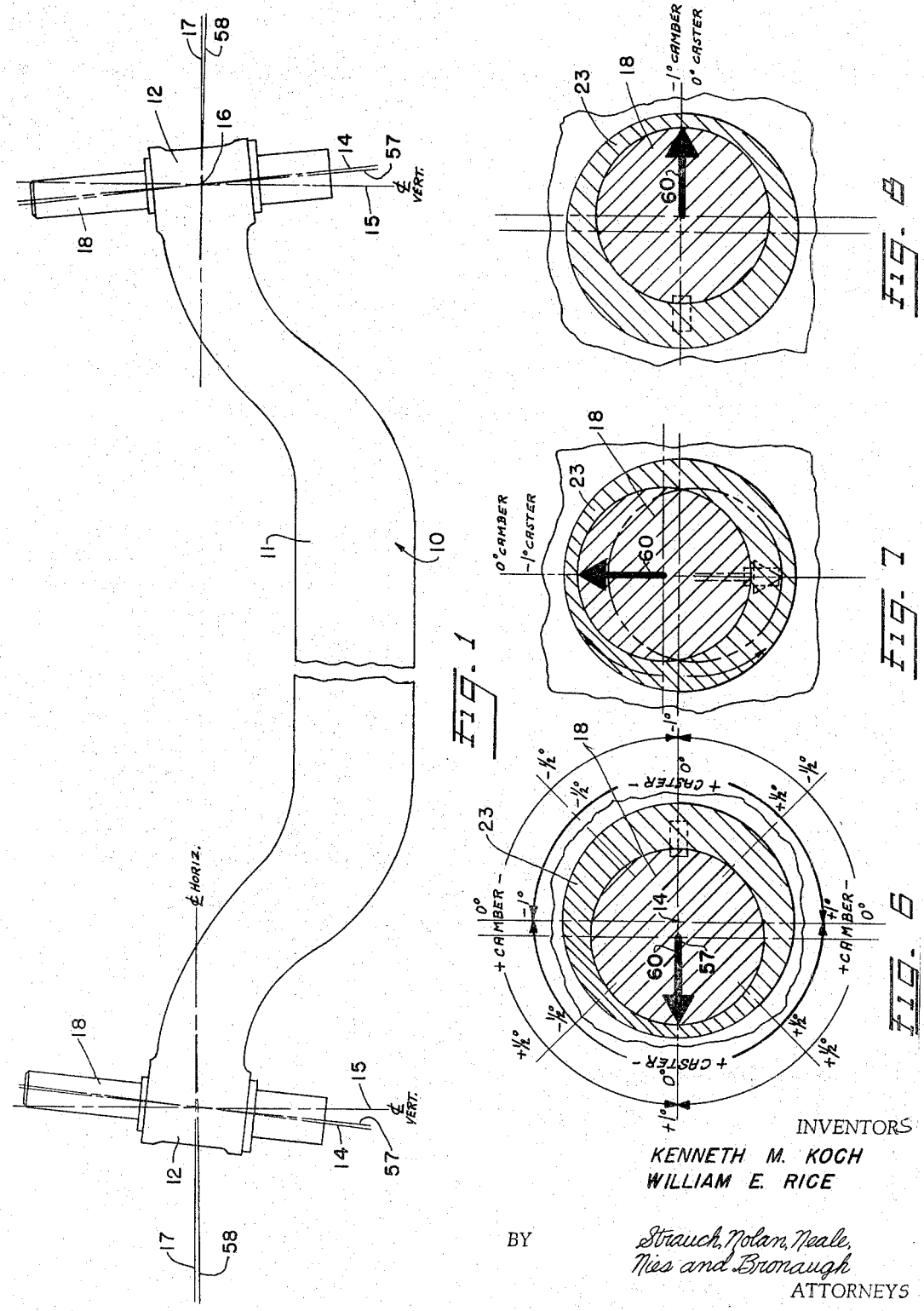

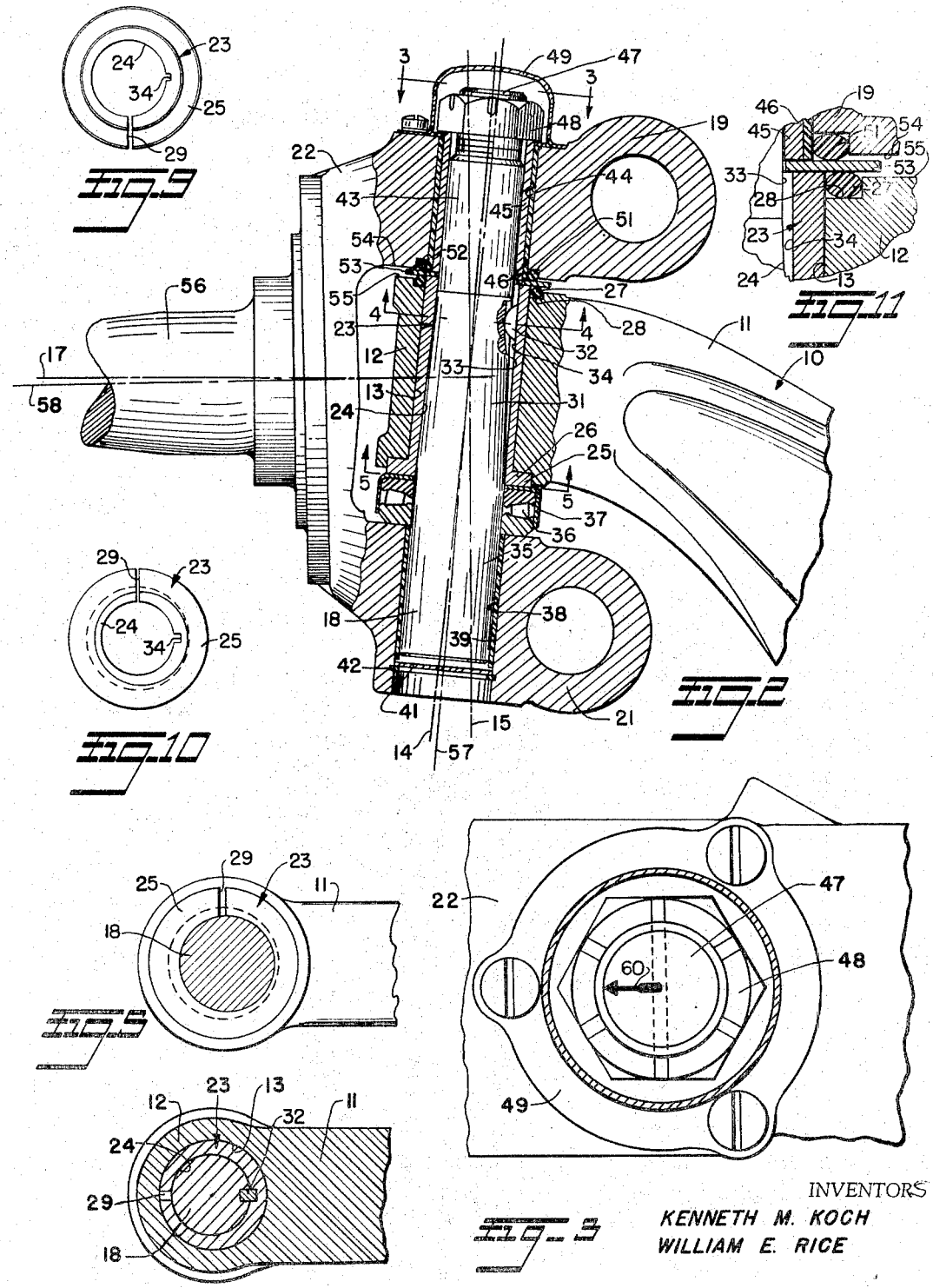

3,342,507
STEERABLE AXLE ASSEMBLY HAVING CAMBER ADJUSTMENT MEANS
Kenneth M. Koch, Dearborn, and William E. Rice, Ferndale, Mich., assignors to Rockwell-Standard Corporation, Pittsburgh, Pa., a corporation of Delaware
Filed Sept. 2, 1965, Ser. No. 484,519
19 Claims. (Cl. 280—96.1)

ABSTRACT OF THE DISCLOSURE

A steerable rigid axle of the type having bosses at both ends which receive substantially vertical king pins extending out of said bosses, and steering knuckles having wheel spindles and arms pivotally attached to said king pins straddling said bosses, eccentric sleeves having tapered bores surrounding said king pins within said bosses and non-rotatably attached thereto, locknuts for said king pins to lock said king pins in place but adaptable to be loosened in order that said king pin and eccentric sleeve assemblies may be rotated within said bosses to thus adjust the wheel camber of said axle.

---

The present invention refers to roadway vehicle front steering axles and more in particular to an adjustable wheel mounting thereof.

It is known in roadway vehicles to mount the front steering wheels in such a manner as to provide what is known as camber, that is, a slight inclination of each wheel, either inwardly or outwardly, with respect to a vertical center plane normal to the ground to compensate for axle deflection under load or similar misalignments and to obtain even tire wear. A related steering wheel mounting is known as caster, which provides a slight forward or rearward inclination of the steering knuckle pivot or king pin relative to the vertical to facilitate the return of the wheel to a straight ahead position after a turn has been made.

The angles involved in setting these particular positions of the wheels, usually incorporated into the steering knuckle pivots, are usually very small, as for instance up to one degree either plus or minus for camber and from one-half to three degrees plus or minus for caster. Usually the camber angle is permanently built into the axle or other wheel support by the vehicle manufacturer.

However, during operation of the vehicle it may be found desirable to readjust either camber or caster or both due to axle distortion, wear in the steering or suspension linkage joints or for other reasons which may indicate themselves by the showing of uneven tire wear and scuffing or oversteering in the case of improper caster.

In passenger cars camber or caster adjustment can usually easily be accomplished by installing or removing an appropriate number of shims at the wheel suspension linkage joints.

However, in commercial vehicles, which usually have a rigid transverse front axle of the Elliot or reversed Elliot type, with steering knuckles pivotally attached to the ends of the rigid axle by king pins, adjustment of camber is usually very difficult.

In the past, camber adjustment on rigid front axles had to be done largely by bending the axle beam. Aside from the undesired additional and metallurgically objectionable stress put into the axle beam by this method, it is costly, time consuming and highly inaccurate. Furthermore, after the camber has been attempted to be adjusted in this manner the spring pads on the axle are no longer in a common plane and to prevent failure in the spring suspension they must be repositioned or ground to be relocated in the same plane. All of this is expensive and undesirably complicated.

The present invention provides means to conveniently adjust the camber in roadway vehicle steering wheel assemblies, especially in front axles of the reversed Elliot type, without having to bend the axle proper. This is accomplished in the preferred embodiment by providing a king pin in conjunction with a steering knuckle and axle boss which is rotatively supported in an eccentric sleeve, so that upon manual rotation of the king pin in the sleeve the angular position of the steering knuckle spindle and thus the vertical inclination of the steering wheel can be varied.

Such camber adjustment will also affect the caster due to the particular structure in the front steering axle arrangements with which the present invention is concerned. However, this can be easily corrected by reshimming between the spring pad and the spring. The range of adjustment is preferably from −1 to +1 degree depending on either positive or negative camber position. This range has been found in most cases to be sufficient.

The present invention also provides means at the king pin to visually indicate the adjusted position of the camber so that a quick visual check can be made to measure the exact amount of camber change as required.

Another object of the invention resides in the provision of a king pin and eccentric sleeve assembly for the steering knuckles at opposite ends of a reversed Elliot type vehicle front axle by means of which the camber of each steering wheel can be adjusted.

Further objects and novel features will become apparent from the following detailed description in connection with the appended drawings wherein:

FIGURE 1 is a full front view of a rigid transverse vehicle front axle with both left and right king pins shown in place within their respective axle bosses;

FIGURE 2 is a fragmentary front elevation partly broken away and in section illustrating the steering knuckle arrangement at one end of a rigid front axle according to a preferred embodiment of the present novel invention, the other end being structurally identical;

FIGURE 3 is a cross section through the king pin and axle boss substantially along line 3—3 of FIGURE 2;

FIGURE 4 is another cross section through the king pin substantially along line 4—4 of FIGURE 2;

FIGURE 5 is an enlarged top view of the upper end of the king pin viewed substantially along line 5—5 of FIGURE 2;

FIGURE 6 is an enlarged cross section view of the king pin and eccentric sleeve arrangement showing the king pin in position for 1° positive camber and indicating a number of various positions to which the king pin may be adjusted within the range of 180° in either direction of rotation;

FIGURE 7 is a view similar to FIGURE 6 showing the king pin in position for zero camber;

FIGURE 8 is likewise similar to FIGURE 6 showing the king pin in position for 1° negative camber;

FIGURES 9 and 10 are respectively top and bottom views of the eccentric adjusting sleeve apart from the assembly; and FIGURE 11 is an enlarged fragmentary view in section showing the upper seal structure.

FIGURE 1 shows a rigid transverse front axle assembly 10 of the reversed Elliot type of more or less conventional structure except for the king pin and related mounting structure at opposite ends. This axle assembly comprises a solid beam 11 formed at each opposite end with an integral boss 12 having a through cylindrical bore 13 for mounting the king pin assembly. The axes 14 of bores 13 are inclined oppositely with respect to the respective vertical planes 15 that pass through the points 16 where each axis 14 intersects a horizontal plane 17 through the bosses 12 midway between the ends of bores 13.

King pins 18 are shown mounted in bosses 12 in FIGURE 1, and reference is made to FIGURES 2–5 for detailed understanding of each king pin mount and adjustment.

FIGURE 2 enlargedly illustrates the left end of assembly 10 as seen from in front of the vehicle. Since this assembly is of the reversed Elliot type, each boss 12 projects between the upper and lower arms 19 and 20 respectively of a steering knuckle 22 pivotally connected to the axle beam by king pin 18.

An externally cylindrical sleeve 23 is rotatably adjustably mounted within bore 13 and is formed with an inclined eccentric inner tapered bore 24. A radial flange 25 on the lower end of sleeve 23 is piloted within a corresponding counterbore 26 in the bottom end of axle boss 12. Tapered bore 24 has its larger end at the bottom at flange 25. The axis of bore 24 intersects the axis of bore 13 at 16, being inclined at about 1° downwardly and inwardly with respect to the axis of bore 13. Around the upper end of sleeve 23 as shown best in FIGURE 11 a compressible sealing ring 27 is provided seated in a recess 28 in the top surface of the axle boss to exclude dirt and moisture from bore 13. Sleeve 23 is axially split at 29 to allow for radial expansion and contraction and thus preventing seizing of the sleeve within bore 13.

Sleeve 23 is adapted to receive the king pin 18 which has a slightly tapered midportion 31 located within sleeve 23 concentric with bore 24. King pin 18 is retained non-rotatably within sleeve 23 as by a key 32 bridging tapered king pin keyway 33 and associated tapered sleeve keyway 34, so that if the king pin should be rotated sleeve 23 will be rotated with it within hole 18 for a purpose to appear.

The lower cylindrical portion 35 of king pin 18 downwardly of sleeve 23 extends through an axial thrust bearing 36 which supports axle boss 12 upon the lower arm 21 of the steering knuckle 22 by flange 25 of sleeve 23 resting upon the outer retaining ring 37 of bearing 36. Below bearing 36, king pin lower end 35 extends rotatably into cylindrical bore 38 in the lower arm 21 of knuckle 22 that is lined with a bushing 39.

The lower end of bore 38 is closed by a disc type plug 41 held within the bore by a lock ring 42, to retain lubricant and exclude dirt and moisture. This closure structure is preferably similar to that disclosed in U.S. Patent No. 2,665,957 to J. J. Glander to which reference is made for further detail.

The cylindrical upper portion 43 of king pin 18 extends into and through cylindrical bore 44 in the upper arm 19 of knuckle 22. Bores 38 and 44 in the lower and upper knuckle arms respectively are aligned and in axial concentricity with each other. The upper king pin end portion 43 is coaxial with but of smaller diameter than the lower end portion 35, and a rigid cylindrical compensating sleeves 45 is provided surrounding the upper portion and supported for rotation within bore 44 in a bushing 46. The upper king pin portion 43 extends outwardly of bore 44 and is provided with a reduced diameter threaded section 47 on which is mounted a lock nut 48. A removable cover and gasket assembly 49 is provided around nut 48 to protect the threads against corrosion and other damage.

The bottom surface of the upper knuckle arm 19 is provided with a counterbore 51 surrounding bore 44 which receives a compressible sealing ring 52 to prevent dirt and moisture from entering the hole 52.

A relatively thin flat but axially rigid spacer washer 53 loosely surrounds the king pin in the space between the bottom surface 54 of upper knuckle arm 19 and the top surface 55 of axle boss 12. Washer 53 is clamped axially between sleeve 45 on one side and the eccentric sleeve 23 on the other side. Washer 53 is axially spaced a small distance from both surfaces 54 and 55 and provides opposite surfaces constantly engaging the compressible opposite sealing rings 27 and 52 during all operation conditions. Due to this unique washer and sealing ring arrangement, steering knuckle 22 is allowed to slightly change its angular position as may be required in the adjustment of the present invention as will appear. When the angular position of the wheel mounting spindle 56 of steering knuckle 22 is changed in relation to the central axis of the axle boss 12 around a line parallel to the axis of the front axle for camber adjustment the provision of the sealing washer 53 in conjunction with the compressible seals 27 and 52 will assure constant maintenance of a tight seal.

In assembly of the structure embodying the invention, sleeve 45 and bushings 38 and 46 are first introduced into the bores of the upper and lower knuckle arms and eccentric bushing 23 is placed in bore 13 of the axle boss. Axle boss 12 is then inserted between the knuckle arms with its bore in substantial alignment with the knuckle arm bores, the knuckle and axle end being held in this assembled position by suitable fixtures. Sealing rings 27 and 52 and washer 53 are then positioned in the assembly between upper knuckle arm 19 and axle boss 12, and thrust bearing 36 is positioned between the lower knuckle arm 21 and axle boss 12.

Now king pin 18 is inserted upwardly through the lower knuckle arm bore and forced home until the threaded end 47 suitably protrudes above the upper knuckle arm 19. The assembly is now completed by mounting nut 48 on the threaded portion 47 and tightening it against sleeve 45 until nut 48, sleeve 45, washer 53 and sleeve 23 are in axially solid force transmitting relation. Further tightening of nut 48 up to a desirable torque limit draws the king pin 18 upward until its tapered midsection 31 is tightly wedged within the eccentric sleeve 23 which in turn is expanded into tight frictional fit with bore 13. Thus king pin 18 is made rigid with axle beam 11 and steering knuckle 22 is mounted on axle boss 12 for swinging rotation relative thereto about the axis of king pin 18 which is indicated at 57 in FIGURE 2 and passess through point 16.

In the present invention the relative camber angle is advantageously selectively provided by the adjustable eccentric sleeve and king pin arrangement described in the foregoing. By simply rotating king pin 18 about its axis, which rotates sleeve 23 along with its within bore 13, any desired camber angle can be obtained within a predetermined range. In FIGURE 2 the adjusted camber is indicated at 1° positive from the horizontal plane 17 going through point 16, that is the axis 58 of the wheel bearing spindle is at a 1° angle with plane 17. Rotation of king pin 18 in either direction, because of the eccentricity of sleeve 23, causes the spindle axis 58 to be displaced upwardly or downwardly from the horizontal, and at the same time this causes the axis 57 of king pin 18 to move in a circular path around the axis 14 of axle boss 12 so that the king pin will be angularly shifted. This relationship is illustrated in FIGURES 6 to 8.

FIGURE 6 indicates the angular adjusting range of the camber for both negative and positive values as king pin 18 and eccentric sleeve 23 are turned together about axis 14 within the axle boss through 180 degrees clockwise or counterclockwise. It will be noted that there is a known fixed relation between changes in camber angle and accompanying changes in caster angle which is such that in clockwise rotation 1° positive camber indicates zero caster, ½° positive camber=½° negative caster, zero camber=1° negative caster, ½° negative camber=½° negative caster, and 1° negative camber=zero caster; in counterclockwise rotation ½° positive camber=½° negative caster, zero camber=1° positive caster and ½° negative camber=½° positive caster. However, this unavoidable but accurately known caster change can be easily compensated for if objectionable as explained previously by shimming between the spring pad and spring to obtain the best position for steering control.

To facilitate checking of the camber angle change without the tedious procedures which have been heretofore necessary, an indicating arrow or like index such as arrow 60 is provided on the upper surface of king pin 18 as illustrated in FIGURE 3 to visually indicate to the mechanic the direction and amount of camber change. The preferred arrangement is such that when the arrow 60 points axially outwardly, that is, away from the longitudinal centerline of the vehicle, as illustrated in FIGURES 3 and 6, 1° positive camber is indicated. From this position it will be relatively easy to adjust the king pin to obtain any desired camber angle within the available range.

In FIGURE 7 the solid outline indicates king pin 18 as rotated clockwise to the zero camber position, and the broken lines indicate king pin 18 as rotated counter-clockwise to likewise a zero camber position.

FIGURE 8 illustrates king pin 18 as rotated through the full range of 180° in clockwise direction to provide 1° negative camber.

Referring to FIGURE 1 which shows the entire front steering axle with both left hand and right hand axle bosses and mounted king pin and eccentric sleeve assemblies, it will be understood that both left and right hand eccentric sleeve adjustment and king pin assemblies are identical except for being reversed. A 1° positive camber for both assemblies is illustrated in FIGURE 1. To assure the same direction of caster angle change in inclination of the king pin at both ends when adjusting camber the opposite king pins must be rotated in opposite directions from each other, that is, when the king pin at the left end of the axle beam is rotated clockwise the king pin at the right end must be rotated counter-clockwise in order to maintain the changed caster angles at both ends in the same plane transversely of the vehicle.

The present invention may be embodied in other forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claims are therefore intended to be embraced therein.

What is claimed and desired to be secured by Letters Patent is:

1. In a steering knuckle and king pin assembly for a steerable axle of the type characterized by a rigid axle beam supported at both ends by ground engaging wheels mounted on said steering knuckle and pivoted upon a king pin, said king pin mounted on said axle beam in substantially vertical angular position, the improvement which comprises means cooperating with said king pin mounting providing adjustment of the vertical angular position of the king pin in regard to the axle beam by rotation of said king pin about its longitudinal vertical axis for infinitely varying said vertical angular position to correspondingly vary the wheel camber.

2. In the steering knuckle and king pin assembly defined in claim 1, means on the king pin for locking said adjustment.

3. In the steering knuckle and king pin assembly defined in claim 1, camber indicating means comprising an index element on said king pin for indicating the adjusted position of said king pin.

4. In said steering knuckle and king pin assembly defined in claim 1, said adjusting means comprising a sleeve rotatably adjustably mounted in a cylindrical bore on the axle member, with said sleeve having an eccentric tapered bore fixedly receiving the king pin and having an axis inclined at a predetermined small angle relative to said axle member bore.

5. In a steerable axle assembly, an axle member, a generally vertical king pin mounted in an end boss on said axle member, a wheel mounting spindle pivotally mounted on said king pin, and wheel camber adjusting means within said end boss on said axle member operable by rotation of the king pin about its longitudinal vertical axis.

6. A steerable axle assembly comprising an axle beam having an end boss having a vertical constant diameter cylindrical bore, a sleeve rotatably adjustably mounted within said boss bore and having an eccentric bore having an axis with respect to said boss bore inclined at a predetermined small angle relative to the axis of said boss bore, a king pin non-rotatably mounted within said sleeve bore and having steering knuckle pivot portions projecting above and below said boss, and a steering knuckle member having upper and lower arms rotatably journaled on said pivot portions.

7. In the steerable axle assembly defined in claim 6, said sleeve being axially split.

8. In the steerable axle assembly defined in claim 6, means on the king pin for indicating its adjusted position.

9. A steerable axle assembly comprising an axle beam having an end boss having a vertical constant diameter cylindrical bore, a sleeve adjustably rotatably mounted within said boss bore and having an inclined tapered bore eccentric with respect to said boss bore, a king pin non-rotatably mounted within said sleeve bore and having knuckle pivot portions projecting above and below said boss, a steering knuckle member having upper and lower arms rotatably journaled on said pivot portions, and seal means interposed between said upper arm of said knuckle member and said boss to prevent entry of foreign matter into the knickle pivots in all adjusted positions of said sleeve.

10. A steerable axle assembly comprising an axle beam having an end boss formed with a cylindrical bore having parallel surfaces throughout and a central axis, a sleeve rotatably adjustably mounted within said boss bore about said axis and having an axis angularly offset from said axis of said boss bore, a king pin having its axis coincident with said sleeve bore axes and non-rotatably mounted within said sleeve bore and having knuckle pivot portions projecting above and below said boss, and a steering knuckle member having upper and lower arms rotatably journaled on said pivot portions, the coinciding axes of said sleeve bore and said king pin intersecting the axis of said boss bore within said sleeve bore at a point about midway between the ends thereof.

11. In the steerable axle assembly defined in claim 10, a laterally outwardly projecting wheel mounting spindle on said steering knuckle member having an axis intersecting said point in a direction substantially normal to said axes of said king pin, sleeves and boss bore, said wheel mounting spindle axis adapted to be angularly adjusted around said intersection point as a pivot.

12. A steerable axle assembly comprising an axle beam having an end boss having a cylindrical bore of constant diameter, an axially split sleeve rotatably mounted within said boss and having a tapered bore eccentric with respect to said boss bore and an axis inclined at an angle with respect to the axis of said boss bore and intersecting the latter, a king pin having a tapered section within said tapered bore non-rotatably mounted within said sleeve bore and having cylindrical knuckle pivot sections projecting above and below said boss, and a steering knuckle member having upper and lower arms rotatably journaled on said pivot portions.

13. In asteering assembly characterized by a support having a king pin mounting boss, a sleeve rotatably adjustably mounted in said boss, a king pin non-rotatably mounted within said sleeve and having a knuckle pivot section projecting beyond said boss, a steering knuckle pivoted on said section, said boss and knuckle having axially facing portions in spaced relation, an annular member rigid with said king pin and projecting into said space, and resilient seal rings compressed axially between said axially facing portions and opposite sides of said member.

14. In the steering assembly defined in claim 13, said annular member being a washer surrounding said king pin with its lower side in abutment with the upper end of said sleeve, an axially rigid sleeve surrounding said knuckle pivot section in end abutment with the other side of said washer, and a nut threaded on said king pin drawn tight against the upper end of said axially rigid sleeve.

15. A king pin mounting member adapted for rotatable adjustment on an axle and consisting essentially of a longitudinally split sleeve having a cylindrical external parallel surface for rotatable mounting on said axle and an internal tapered bore for receiving the king pin, said bore lying substantially in a surface of revolution about an axis that intersects the axis of said cylindrical parallel surface within said bore at an angle relative to said cylindrical external, parallel surface axis so that the opposite ends of said tapered bore are eccentric with respect to said cylindrical surface.

16. The king pin mounting member defined in claim 15, wherein said axes intersect about midway of the length of said bore.

17. The king pin mounting member defined in claim 15, wherein said angle is about 1°.

18. The king pin mounting member defined in claim 15, wherein said sleeve at one end is formed internally with a keyway for receiving a key non-rotatably securing said sleeve to the king pin, and is formed at the other end with an enlarged radial flange adapted to interfit with the axle end.

19. A steering knuckle and king pin assembly for use in a rigid type steering axle, comprising a king pin having cylindrical end portions connected to a tapered midportion, a sleeve non-rotatably secured around said midportion having a tapered bore and a wall of radially varying thickness, said sleeve having a cylindrical outer surface of constant diameter and adapted to be rotatably inserted within a cylindrical bore in the end of said axle, said cylindrical end portions of said king pin adapted to extend out of said axle end bore to pivotally support opposite arms on said steering knuckle, one of said end portions of said king pin being provided with screw threads to receive a locknut to lock said king pin and sleeve assembly in said axle end bore when said locknut is tightened and to free said king pin and sleeve assembly when said locknut is loosened in order to rotate said king pin and sleeve assembly within said axle and bore to thus vary the relative angular position of said steering knuckle in relation to said king pin.

References Cited

UNITED STATES PATENTS

| | | | |
|---|---|---|---|
| 1,384,309 | 7/1921 | Druar | 280—96.1 |
| 2,153,271 | 4/1939 | Paton. | |
| 2,274,353 | 2/1942 | Ash | 280—96.1 |
| 2,613,091 | 10/1952 | Funnell | 287—100 |
| 2,665,957 | 1/1954 | Glander | 280—96.1 X |
| 2,890,893 | 6/1959 | Laukhuff | 280—96.2 |
| 2,923,555 | 2/1960 | Kost et al. | 280—96.1 |

FOREIGN PATENTS 603,199   6/1948   Great Britain.

KENNETH H. BETTS, *Primary Examiner.*